Nov. 30, 1943.  J. HADDAD  2,335,755
AUTOMATIC TELEMETERING SYSTEM
Filed July 23, 1942  3 Sheets-Sheet 1
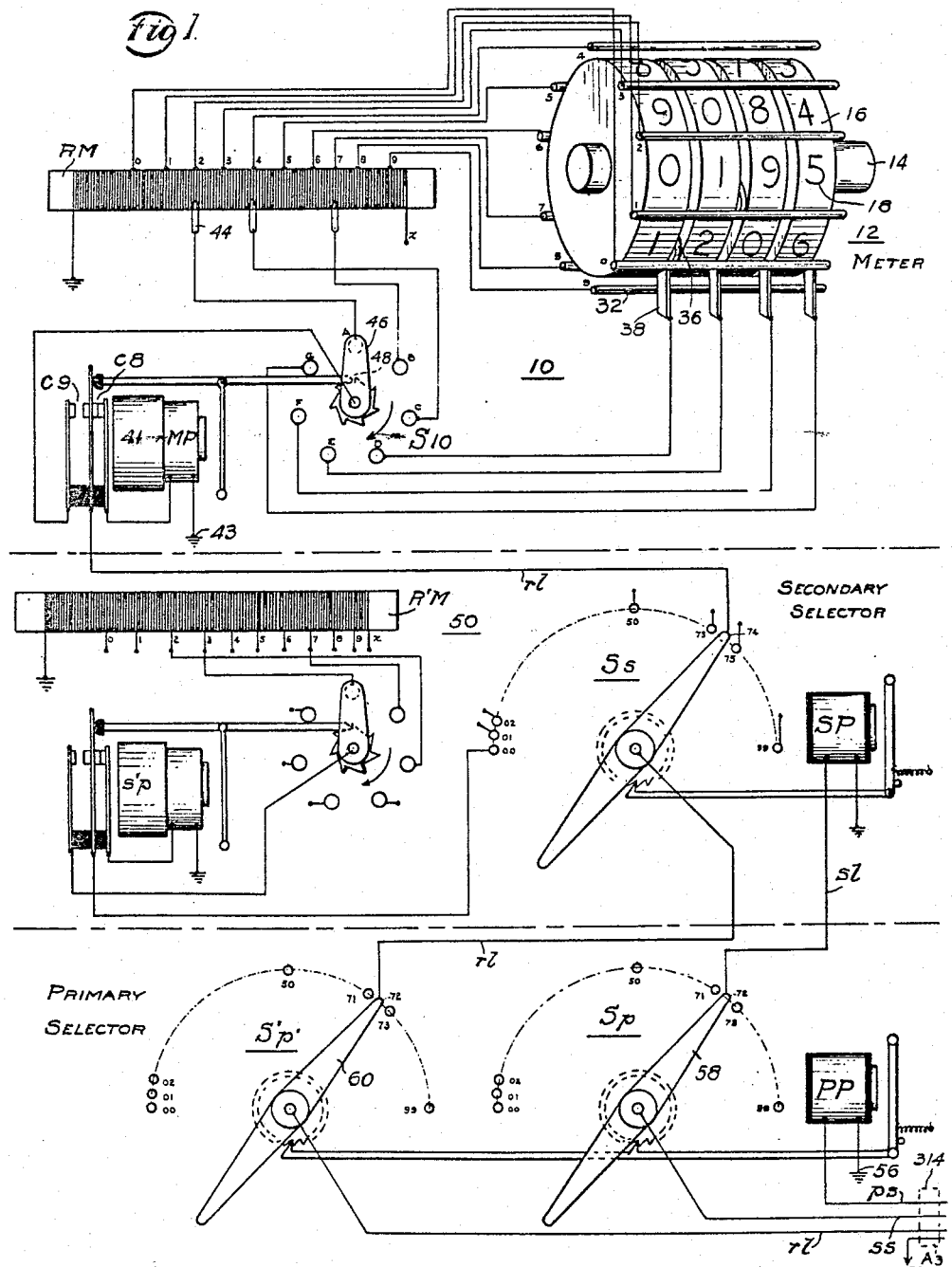
INVENTOR:
Jerrier Haddad.
BY
ATTORNEY Nov. 30, 1943.　　　　J. HADDAD　　　　2,335,755
AUTOMATIC TELEMETERING SYSTEM
Filed July 23, 1942　　　3 Sheets-Sheet 2
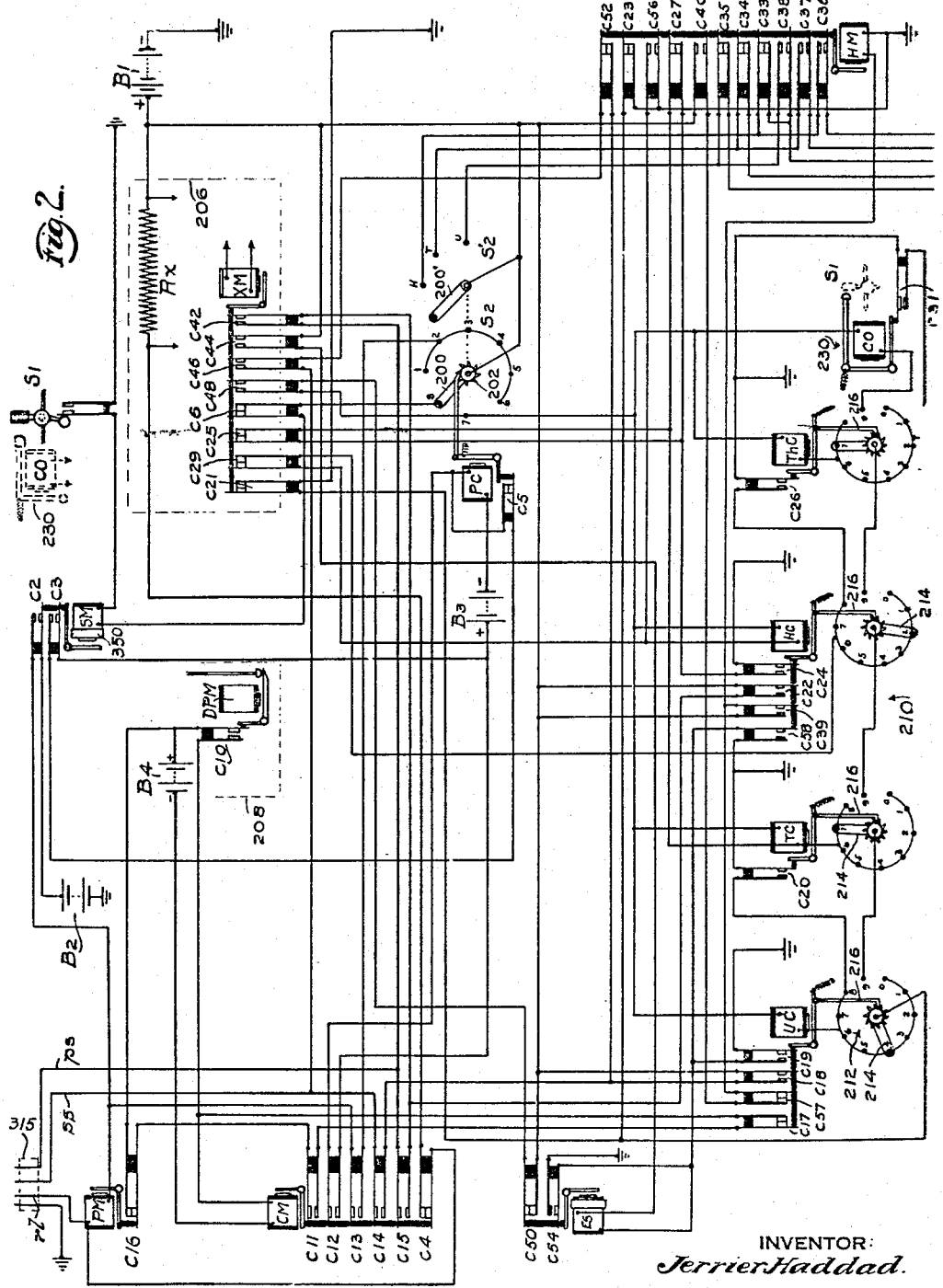
INVENTOR:
Jerrier Haddad.
BY
ATTORNEY Nov. 30, 1943.  J. HADDAD  2,335,755
AUTOMATIC TELEMETERING SYSTEM
Filed July 23, 1942  3 Sheets-Sheet 3
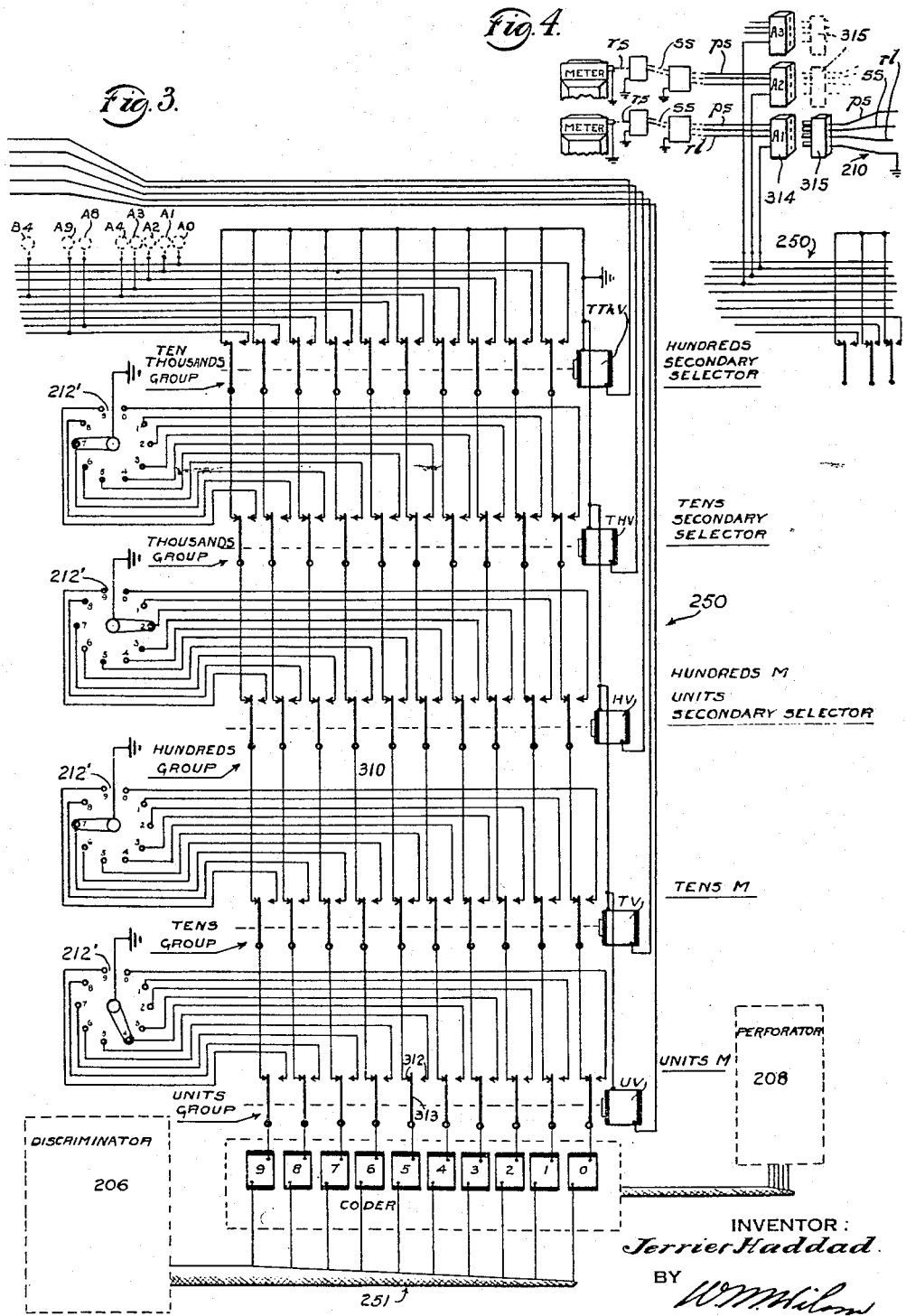

Patented Nov. 30, 1943

2,335,755

UNITED STATES PATENT OFFICE 2,335,755

AUTOMATIC TELEMETERING SYSTEM

Jerrier Haddad, Brooklyn, N. Y., assignor to International Business Machines Corporation, New York, N. Y., a corporation of New York Application July 23, 1942, Serial No. 452,040

11 Claims. (Cl. 177—351)

The present invention relates to telemetering apparatus and more particularly to an apparatus designed for use in connection with metering systems of the type ordinarily employed for registering the volume consumption of the metered commodity, which, for example, may be electricity or gas. The primary purpose of the present invention is to provide a system and apparatus for recording at a central station the reading of such a meter at a remote point.

More specifically, the present invention relates to an apparatus for successively reading at a central station the indications of a plurality of meters located at outlying points. The apparatus is electrically actuated in order to obtain high speed of operation and it is provided with electric coding and recording mechanism whereby the successive readings may be recorded on a tape or the like in the form of perforations. The recordings which are made at the central station indicate not only the readings of the various meters but also the arbitrary meter identification numbers in order that the various meter accounts may be distinguished one from another. In other words, according to the present invention, the meter may be set up to yield at the central station the various arbitrary identifying numbers of the meters and also their particular dial indication as well as any other data that it may be desired to indicate on the record.

The present invention is designed as an improvement in the type of meter reading system shown in U. S. patent to Ward Leathers, No. 2,304,698, dated December 8, 1942, for Meter reading apparatus, and has for its principal object provision of a system of meter reading which is fully automatic in its operation and which will operate to select the various meters at the outlying stations in succession and render a record of their respective readings at the central station.

An equally important object of the invention is to provide a self-actuated, electrically operated meter reading system, the operations of which follow in a predetermined sequential order with each operation depending for its initiation upon a preceding operaton in such a manner that no one operation or function of the apparatus may be undertaken until its preceding and initiating operation has been completed, thus affording a constant check on the operation of the apparatus, both as regards the selection of the various meters and the accuracy of the information transmitted thereby. Stated differently, it is an object of the present invention to provide a fully automatic telemetering system which dispenses with the necessity of providing an initiating timing system for maintaining the various parts of the apparatus in proper phase.

Yet another object of the invention is to provide an apparatus of this character employing a series of primary selectors, each of which is electrically connected to a plurality of secondary selectors and in which each secondary selector is connected to a plurality of meters; together with means for identifying the various meters, for identifying the various secondary selectors and for identifying the various primary selectors at the central station, the entire system being so constructed that all of the phasing operations, both as regards the meter and the primary and secondary selectors, are continually verified during the normal operation of the apparatus.

A still further object of the invention is to provide a fully automatic telemetering apparatus of this character having provision for passing over or rapidly skipping any meters such as are not actually in use or any primary or secondary selectors not in use.

Other objects and advantages of the invention not at this time enumerated will become apparent as the following description ensues.

In the accompanying three sheets of drawings forming part of this specification:

Fig. 1 is a schematic view showing a meter, a secondary selector and a primary selector all connected together in accordance with the principles of the present invention for telemetering purposes.

Fig. 2 is a diagrammatic view showing the arrangement of the apparatus at the central station, and Fig. 3 is a diagrammatic view of a verification apparatus employed in connection with the present invention.

Fig. 4 is a diagrammatic view on a reduced scale of the complete telemetering system comprising the present invention.

In all of the above described views, similar characters of reference are employed to designate like parts throughout.

Briefly, the invention contemplates the provision of a meter reading apparatus which operates to record at a central station the indication of a large number of meters located at separated outlying districts. The meter identification includes a meter identifying number, preferably consisting of three digits together with the actual meter register reading which is ordinarily expressed in terms of four digits. Each meter, as in the case of the above mentioned patent to Ward Leathers, is connected to the central station through a secondary selector which is in turn connected to a primary selector, the primary selector being connected directly to the central station. The apparatus at the central station includes a starting switch which, upon closing, serves to energize a starting magnet. The starting magnet operates to actuate or pulse a meter stepping switch located at the meter and by means of which a series of resistances, each representing a digit either in the meter identification number or in the meter register reading, is connected to the reading line leading to the central station for meter reading purposes. The stepping switch serves to successively connect the various resistances in the reading circuit and at the central station a discriminating apparatus interprets the values of the resistances as they are received, while a perforating mechanism applies perforations to a tape in accordance with such readings and according to a selected code. The operation of the apparatus is continuous during the reading of all seven numerals which complete the meter reading, including three digits for the account number and four digits for the registered reading of the meter. After the seventh or last numeral has been recorded on the tape, an electrical counting mechanism is advanced and a stepping switch at the secondary selector is pulsed, thus selecting the next meter for reading purposes. This cycle of operation continues until 99 meters have been read. The next reading offered to the central station, instead of being that of a meter, is the identification number of a new secondary selector and at such time as this secondary selector identification number is received at the central station, the counter mechanism is again advanced. Each time 99 secondary selectors have been read at the central station, the primary selector is pulsed.

In the event that a consumer has discontinued his service or the public utility company has made provision for an additonal consumer or consumers, either by leaving meter account numbers vacant or by leaving primary or secondary selector account numbers vacant, a blank contact on a secondary selector or primary selector, as the case may be, and a special value of resistance is connected in the reading circuit leading to the central station. When at the central station the special value of resistance is received and discriminated, an electric counter is advanced one position in the case of a vacant meter number or one hundred positions in the case of a vacant secondary selector and, in such an instance, the recorded tape at the central station will neither be advanced nor perforated, thus no time is consumed in the reading of meters or secondary selectors which have not been assigned to use. In other words, meter No. A37274 will be the meter connected to the 74th contact on the secondary selector which is connected to the 72nd contact on the primary selector that is connected to the jack A3 at the central station. The identifying number read for this meter will be 274, the 2 in this case being taken from the 72 of the secondary selector and definitely binding that meter to that particular secondary selector. In this invention, the 2, the 7 and then the 4 (in this special case) are checked against a similar number set up in the electrical counting mechanism previously mentioned. Should any one of the three digits not check at the central station, an error has been detected, and the apparatus will automatically cease operation.

Referring now to the drawings, and particularly to Fig. 1, a meter, designated in its entirety at 10, involves in its general organization a cyclometer wheel or cylinder assembly 12, including a fixed supporting shaft 14 having a plurality of axially aligned cyclometer wheels 16 carrying on their circumferential surfaces a plurality of indicia 18 in the form of Arabic numerals consecutively arranged from 0 to 9. A window may be formed in the meter casing, not shown, to permit ready visualization of these numerals for meter reading purposes by an observer.

The wheels or cylinders 16 are capable of movement on the shaft 14 and are so designed that they will cumulatively indicate the measured volume consumption of current as expressed in watthours. The specific mechanism whereby such cumulative additive indication is obtained is not disclosed and any one of a number of well known step-up cumulative mechanisms utilizing a driving gear may be employed. Irrespective, however, of the specific mechanism employed for this purpose, the essential features of the invention are at all times preserved. Any suitable number of cylinders 16 may be employed, but in the present instance there have been illustrated four such cylinders, the successive cylinders representing in the Arabic system units, tens, hundreds and thousands digits respectively. The units cylinder is driven in timed relation to the movement of the usual armature shaft, not shown, of the meter.

A plurality of fixed contact bars 32 are arranged in spaced relationship around the peripheries of the various cylinders 16 and are of sufficient length to span all four of these cylinders. A spiral contactor spring 36 is secured to each wheel and is adapted to successively engage the various contactor bars 32. The various contactor bars, in addition to their common designating reference characters, have for illustrative purposes been supplied with Arabic numeral designations corresponding to those appearing on the peripheries of the cylinders. A slip-ring contact or brush 38 provides an attachment point for a common return lead wire, the various lead wires being electrically connected to respective contacts D, E, F and G of a selector switch S10 for a purpose that will presently appear. Each conductor bar 32 is connected to a wire-wound resistor RM at varying tap points thereon designated by Arabic numerals corresponding to the various digits of the indicia carried by the cylinder 16. The conductor bar representing the digit zero is electrically connected to a point of minimum or low resistance on the resistor RM.

The selector switch S10, in addition to the contacts D, E, F and G, includes three additional contacts A, B and C, which are adapted to be selectively connected by means of spring clips 44 to selected tap points on the resistor RM to represent a particular meter number, as will appear presently.

A distributor arm 46, capable of being indexed by means of a ratchet mechanism 48, is connected to one contact of a pair of normally open contacts C9 and the other contact thereof is connected to a reading line rl leading through the secondary and primary selectors to the central station. A second normally closed pair of contacts C8 is connected to the reading line and also to a phasing or meter pulsing magnet MP provided with a delay action copper jacket 41. The magnet MP is grounded as at 43. The impedance value of reading circuit or line rl will depend, of course, upon the setting of the various spring clips 44 by means of which the resistor is tapped. Closing of a circuit through the magnet MP from the central station serves to actuate the selector switch S10, while at the same time the normally closed contacts C8 will become open and the normally open contacts C9 will become closed, thus disconnecting the magnet MP from the reading line and connecting a selected resistance into the reading line for reading purposes. The nature of the copper jacket 41 is such as to afford time for the discriminating apparatus at the central station to perform its discriminating function. The alternate "closing and opening" of the switches C9 and C8 respectively is defined herein as a "pulse and read" function and forms the subject matter of a U. S. patent to Ward Leathers, No. 2,295,533, dated September 15, 1942, for Meter reading apparatus.

The secondary selector is designated in its entirety at 50 and the arrangement of the pulse and read apparatus in this secondary selector is somewhat similar to the arrangement of apparatus shown at the meter. The pulse and read magnet is designated at S'P. The identifying resistance of the secondary selector is designated at R'M. A stepping switch Ss, which does the meter selecting, is provided with a pulsing magnet SP.

It is believed that the operation of the secondary selector will be obvious in the light of the foregoing description of the meter pulse and read functions. However, for a full description of its operation reference may be had to the above mentioned patent to Ward Leathers. The reading line rl is continued through the secondary selector, as shown, and an additional wire sl for stepping purposes leads from the magnet SP to one of a plurality of contacts contained in a similar stepping switch Sp contained at the primary selector.

The primary selector is likewise similar in its construction to secondary selector just described, with the exception that an additional selector switch S'p' is provided and by means of which the various reading lines leading to the secondary selector are selected. The pulsing magnet for the primary selector is designated at PP. One side of this magnet is connected to ground as at 56, while the other side thereof is connected to a line ps leading to the central station. The contact arm 58 of the stepping switch Sp is connected to a line ss while the contact arm 60 of the switch S'p' is connected to the reading line rl leading to the central station. The operation of the primary selector is apparent in the light of the disclosure made in the above mentioned copending application.

Owing to the rather complicated nature of the electrical apparatus employed in connection with the present invention, no attempt will be made herein to specifically point out the various parts of the apparatus for the purpose of affording antecedents to the final description of the operation of the apparatus. It is deemed sufficient to immediately set forth the operation of the apparatus and, in so doing, the various electrical parts referred to will thus be introduced.

Referring now to Fig. 2. In order to set the apparatus into operation it is merely necessary for the operator to close the switch S1, whereupon a local circuit, including the battery B1, arm 200 of the switch S2, the eighth contact thereof, the normally closed contacts C6, a starting magnet SM and the switch S1 to the opposite terminal of the battery B1 and ground, is completed. Closing of the circuit just described serves to energize the starting magnet SM, thus attracting its armature and closing a pair of contacts C2 and C3. Closing of the contacts C2 establishes a circuit which includes the battery B2, the magnet PM, reading line rl leading through the primary and secondary selector, and meter pulsing magnet MP located at the meter 10.

Closing of the contacts C3 establishes a local circuit which includes the battery B3, contacts C3 and C5, and the magnet PC. Energization of the magnet PC serves to attract the armature thereof, thus presetting the ratchet mechanism 202 and, at the same time, causing the contacts C5 to immediately become broken. The magnet PC thus becomes deenergized and releases its armature for positive actuation of the rotary switch S2 by the ratchet mechanism 202. Such actuation of the switch S2 causes the switch arm 200 to move from the eighth contact to the first contact thereof.

Upon movement of the arm 200 to the first contact of the switch S2, the circuit previously completed is broken and the starting magnet SM becomes deenergized and remains in this condition throughout the remainder of the cycle of operation of the apparatus.

As will become apparent presently, the contacts C3 which, upon being closed, serve to energize the magnet PC, are arranged in series with the contacts C5 and both of these pairs of contacts are arranged electrically in parallel with a pair of contacts C12, so that upon opening of the contacts C3 by the magnet SM after the latter has become deenergized, the contacts C12 will take the place of the contacts C3, insofar as operative function is concerned, and serve to control the energization of the magnet PC, regardless of the condition of the contacts C5.

Upon energization of the meter pulsing magnet MP, the contacts C8 become opened and the contacts C9 become closed, thereby establishing the reading circuit in the manner previously described, through the reading line rl, the normally closed contacts C4, resistance Rx forming part of a discriminator subsequently to be described, and battery B1. During the time that the contacts C9 remain closed under the influence of the copper jacket on the magnet MP, discrimination takes place by means of the discriminating apparatus above referred to and diagrammatically illustrated at 206, and, as set forth in a U. S. Patent to Ward Leathers, No. 2,295,534, dated September 15, 1942, for Automatic meter reading apparatus, the perforating mechanism 208 is caused to function. The discriminator 206 has associated therewith a magnet XM, in addition to the structure shown in the above mentioned patent to Ward Leathers. The magnet XM is adapted to be energized when a value of resistance higher than any of the values used to represent the ten digits 0 to 9 is transmitted over the reading line rl to the discriminator 206. The location of the magnet XM in the discriminator circuit will become readily apparent upon reference to the specification and drawings of the said patent, inasmuch as this magnet is merely an additional magnet arranged in the block of magnets illustrated. A tape advancing magnet DPM, which forms a part of the perforating apparatus, is shown in the said patent to Ward Leathers, is thus energized in order that the tape may be advanced from one index point position to the next. Upon energization of the magnet DPM, a pair of contacts C10 become closed, establishing a local circuit leading from the battery B4 through the control magnet CM.

Energization of the control magnet CM serves to close a group or gang of contacts C11, C12, C13, C14, and C15 simultaneously, while also opening the pair of contacts C4 previously mentioned. The contacts C11 are in series with a pair of contacts C16 and a pair of contacts C17, both of which latter pairs of contacts are normally closed. The contacts C11 are also disposed in parallel with the pair of contacts C10 at the perforator, and thus closing of the contacts C11 serves to establish a holding circuit by means of which the magnet CM is locked in its energized condition, awaiting opening of either the pair of contacts C16 or C17 for its release.

Closing of the contacts C12 serves to close a circuit through the magnet PC from the battery B3 and serves to preset the ratchet mechanism 202 without advancing the rotary stepping switch S2. Closing of the contacts C13 applies an impulse potential across the series arrangement of the magnet PM and the reading line $rl$ and ground by means of the battery B1. Closing of the contacts C14 and C15 have no electrical effect at this stage. Opening of the contacts C4 serves to disconnect the discriminator 206 from the reading line, thus preventing the impulse potential applied thereto from affecting the discriminator circuit.

Prior to opening of the contacts C9 at the magnet MP in Fig. 1, a circuit is established through the meter reading resistance unit RM and reading line $rl$, magnet PM and battery B1 to ground. Because of the fact that the meter reading resistance RM is of a relatively high ohmic value, the magnet PM will receive insufficient current for its full operative energization.

As soon as the delay caused by the copper jacket 41 on the magnet MP has taken effect and the contacts C8 have become closed, the arm 46 on the rotary stepping switch S10 becomes advanced. Upon closing of the contacts C8, the impulse potential previously applied to the line $rl$ becomes effective to energize the magnet MP, and also the magnet PM in series therewith, and again open the contacts C8 and close the contacts C9, thus presetting the ratchet mechanism 48. Closing of the contacts C9 serves to place a portion of the resistor RM in the reading circuit, as determined by the particular identification character of the meter 10.

Because of the fact that the magnet PM at the central station is arranged in series with the magnet MP at the meter, both of these magnets become energized simultaneously during the pulsing of the meter phasing switch S10. Energization of the magnet PM serves to open the pair of contacts C16 and these latter contacts, by virtue of their series arrangement with the locking contacts C11 and the normally closed pair of contacts C17, serves to deenergize the control magnet CM and allow the gang contacts C11, C12, C13, C14 and C15 to become opened, while at the same time the pair of contacts C4, also controlled by the control magnet CM, will become closed. Opening of the contacts C12 serves to deenergize the magnet PC, whereupon the ratchet mechanism 202 makes its operative stroke and causes the switch arm 200 of the switch S2 to advance from the first to the second contact position of the switch S2. Opening of the contacts C13 removes the impulse potential formerly applied to the reading line $rl$. Closing of the contacts C4 serves to connect the reading line $rl$ to the discriminator apparatus 206 for reading purposes, whereupon discrimination of the voltage drop across the resistor $Rx$ takes place and the perforating mechanism 208 is again actuated in the manner previously described.

Actuation of the perforating mechanism 208 serves to again close the contacts C10, which, in turn, cause energization of the control magnet CM and a consequent closing of the gang contacts controlled thereby and an opening of the contacts C4, in the manner set forth previously. The operation continues in this manner until such time as the armature 200 of the switch S2 advances to the seventh contact position, such advancement taking place by virtue of the magnet MP being energized simlultaneously with the magnet PM, which latter magnet opens its contacts C16 to destroy the locking effect upon the magnet CM caused by the reading of the sixth numeral and allow the circuit through the magnet PC to become broken, thereby advancing the arm 200.

Movement of the arm to the seventh contact position of the switch S2 establishes a circuit leading from the battery B1, through the magnet UC, forming a part of an electrical counter arrangement 210, the nature of which will be set forth subsequently, whereupon the armature thereof is attracted and the normally open contacts C18 and C19 become closed, while the normally closed contacts C57 and C17 become open.

Closing of the contacts C18 serves to create a potential from the battery B1 at the contacts C14 for future application to the line $ss$ when these latter contacts are closed preparatory to pulsing or advancing the secondary selector. Opening of the contacts C17, which are in series with the contacts C11 and C16, renders the contacts C11 ineffective to lock the magnet CM after the perforator has been actuated.

During the reading operation for the seventh and last numeral of the meter reading, the perforating drive magnet DPM becomes energized, whereupon the contacts C10 become closed, thus closing the circuit through the control magnet CM and again reversing the position of the various contacts C11, C12, C13, C14, C15 and C4 controlled thereby. Closing of the contacts C11 at this time has no significance, inasmuch as the contacts C17 in series therewith remain open as just described. Closing of the contacts C12 closes the circuit through the magnet PC, thus energizing the same and causing the ratchet mechanism 202 to become preset. Closing of the contacts C13 is without function because of the fact that the arm 200 is no longer in contact with the common group of contact positions 1 to 6, inclusive. Closing of the contacts C14 applies an impulse to the line $ss$ and causes the ratchet mechanism of the secondary selector to become preset.

Opening of the contacts C4 serves to disconnect the discriminating apparatus from the reading circuit, thus allowing the perforating punch to be withdrawn from the tape by virtue of deenergization of the drive magnet DPM. Such deenergization of the drive magnet DPM releases the armature thereof and allows the contacts C10 to become open, whereupon the control magnet CM is deenergized and the group of contacts C11 to C15 inclusive, together with the contacts C4, reverse their positions.

Opening of the contacts C11, C13 and C15 is, at this stage in the cycle, without significance.

However, opening of the contacts C12 serves to deenergize the coil PC, thus releasing the ratchet mechanism 202 and causing the switch arm 200 to move to the contact position 8. Opening of the contact C14 deenergizes the pulsing magnet at the secondary selector and allows the ratchet thereof to advance the contact arm to the next contact position. Closing of the contacts C4 is not attended by any function, inasmuch as the secondary selector has advanced to the next group of meters and the particular meter whose reading line passed through this pair of contacts has been left behind, so to speak.

Upon movement of the contact arm from contact position 7 to contact position 8, the circuit formerly passing through this contact position becomes open, whereupon the magnet UC becomes deenergized, thus advancing the units counter arm 214 one position and also reversing the positions of the various contacts C57, C17, C18 and C19.

Opening of the pair of contacts C57 and opening of the contacts C19 have no electrical significance. However, closing of the contacts C18 serves to render the secondary selector pulsing circuit, as controlled by the magnet CM, ineffective. Closing of the contacts C17, which latter contacts are in series with the contacts C11 and C16, serves to potentially reestablish the locking circuit for the control magnet CM, the nature of which has previously been described.

The operation of the apparatus thus far described, under normal circumstances, represents one complete cycle of machine operation. This cycle is repetitious and will continue indefinitely, barring certain exceptional conditions, as, for example, where meters are to be skipped, etc., or until the switch S' is opened, which will permit completion of the current cycle but prevent commencement of the succeeding cycle.

The electric counter

Still referring to Fig. 2, the electrical counter arrangement designated generally at 210, consists of a series of rotary stepping switches 212, each having stepping arms 214 which are controlled by means of ratchet mechanisms 216, which are, in turn, actuated by means of the various stepping magnets UC, TC, HC, and ThC. Each stepping switch 212 is provided with ten contact positions, which positions are respectively labeled from 0 to 9 inclusive. The various contacts, extending from the position 0 to the position 8 inclusive of each switch, are electrically connected together, whereas the contact at the position 9 is electrically insulated from the remainder of the contacts. The contact at the position 9 in the units stepping switch is connected to the arm 214 of the tens stepping switch. Similarly, the contact at the position 9 of the tens stepping switch is connected to the contact arm of the hundreds stepping switch. The contact at the position 9 of the hundreds stepping switch is connected to the contact arm of the thousands stepping switch. Finally, the contact at the position 9 of the thousands stepping switch is connected to a circuit opening magnet CO associated with the starting switch S1. The windings of the various magnets UC, TC, HC and ThC are connected to the respective common connections existing between the contacts 0 to 8, inclusive, of their respective switches, and also these windings are connected to a common wire leading to the contact at the position 7 of the stepping switch S2.

Each time energization of one of the magnets UC, TC, HC or ThC, as the case may be, occurs, the respective ratchet mechanism 216 thereof becomes preset and, upon subsequent deenergization of these magnets, the respective ratchet mechanisms operate to advance the various arms 214 one position or step. Therefore, when the arm 214 of the stepping switch controlled by the magnet UC is in the ninth position of the switch, impulses fed to this switch from the contact 7 of the switch S2 are unable to find a path to ground through the arm. Thus, such impulses are applied to the magnet TC and from thence through the arm of the switch 212 controlled thereby to the arm of the switch controlled by the magnet UC and from thence to ground through either a pair of normally closed contacts C21 or a pair of normally closed contacts C23. Energization of the magnet TC closes a pair of contacts C20, thus providing a path to ground for the common group of contacts 0 to 8 of the switch which is controlled by the magnet UC. Thus, a path is provided whereby current may flow through the magnet UC and energize the same, thus presetting the ratchet mechanism 216 of this latter switch. Upon movement of the arm 200 from the contact 7 of the switch S2, both magnets UC and TC become deenergized and their respective ratchet mechanisms 212 perform their operative strokes, advancing the arm 214 of the units switch to the position 0 and also advancing the arm of the tens switch one step.

When the arms 214 of both the units and tens switches are at their respective ninth positions, current flowing from the contact at the position 7 of the switch S2 will find no path to ground through these switches and will, therefore, be obliged to find its path through the magnet HC to the hundreds switch and from thence through the three contact arms of the hundreds, tens and units switches, in the order named, and from thence to ground, following the path previously described. Obviously, if the arms 214 of the units, tens and hundreds switches are all on their respective ninth positions, current will flow through the magnet ThC and arms of all the various switches under consideration to ground. Finally, if the arms 214 of all four switches rest in their respective ninth positions, the circuit opening magnet CO will become energized, thus attracting its armature 230 and thereby opening the switch S1 and causing the apparatus to terminate its operation.

Energization of the magnet HC serves to close a pair of contacts C22, which are arranged in series with the pair of contacts C15 and which serve to create a potential at the contacts C15 for future application to the line ps when these latter contacts become closed. Thus it can clearly be seen that the magnet PP in the primary selector will become energized at the end of every hundredth reading since during this reading the magnet HC will be energized, thus closing contacts C22. The magnet CM will also become energized by virtue of the perforating of the last or seventh character of the reading, thus closing contacts C15 and applying a potential from the battery B1 to the line ps. The energization of the magnet HC also serves to close a pair of contacts C24 which are arranged in series with a parallel arrangement pair of contacts C25 and C27, through either or both of which latter contacts an impulse is applied to the magnet TC for energization thereof and subsequent energization of the magnet UC, as previously described.

Upon energization of the magnet ThC, a pair of contacts C26 become closed, thus allowing current to flow through the magnet HC and a pair of normally closed contacts C29 in series therewith to ground. The magnet HC in turn causes energization of the magnet TC, and the magnet TC further causes energization of the magnet UC, so that all four of these magnets ordinarily become energized each time the magnet T$h$C becomes energized.

The magnet CO has associated therewith a pair of contacts C31, which, upon closing, serves to energize the magnet T$h$C and, as previously described, the preceding magnets HC, TC and UC will ordinarily become energized sequentially each time the magnet CO is energized.

The verifying apparatus

Means are provided for periodically verifying at the central station the identification number of each meter undergoing reading and also for periodically verifying the identification number of each secondary selector when that selector is encountered immediately after the reading of all of the meters controlled by the preceding secondary selector. Whenever, according to the verification apparatus employed, either the verification of the meter identifying number, or of the secondary selector identifying number appearing in the electric counter 210 does not agree with the respective meters or secondary selectors actually being read, means are further provided for stopping the operation of the apparatus. Toward this end, each of the switches 212 has as its counterpart an auxiliary switch or second level 212' (see Fig. 3), the contacts of which are each electrically connected to the coding mechanism 251 in a manner which will be more fully set forth presently.

The switch S2 (see Fig. 2) is provided with a second level designated at S'2 having three contacts representing units, tens and hundreds digits respectively and so indicated in the drawings by the letters U, T and H. These three contacts occupy positions in the second level corresponding to the positions 1, 2 and 3, respectively, of the main switch level and are the only contacts employed in the second level. The three contacts U, T and H are adapted to be successively engaged in reverse order by a rotary arm 200', which is connected electrically and mechanically to the arm 200 of the main switch level S2.

Movement of the switch arm 200 from the eighth position to the first position, as controlled by the magnet PC, represents commencement of the reading of a particular meter. Each time the arm 200', in the second level of the switch S'2, engages the hundreds contact H, a circuit is closed leading from the battery B1 through the arm 200' and a pair of normally closed contacts C33 to the magnet HV of the verifying mechanism 250 (see Fig. 3) and from thence to ground. The establishing of this circuit energizes the magnet HV, which in turn causes certain operations to be performed by the verifying mechanism 250, whereby the coder 251 will function when, and only when, the proper digit is applied to the same by the discriminator 206.

In a similar manner, when the arm 200' is in engagement with the contact T of the switch level S'2, a circuit will be closed leading from the battery B1, through the contacts C34 and magnet TV in the verifier 250, thus causing certain other operations of a verifying nature to be performed. Finally, when the arm 200' is in engagement with the contact U, a circuit leading from the battery is closed through the contacts C35 and the magnet UV in the verifier is energized to similarly effect other similar verifying operations.

The magnets UV, TV and HV are employed when verifying the identification number of a meter. However, when verifying the identification number of a secondary selector, the magnets UV and TV are not employed and instead a pair of magnets T$h$V and TT$h$V become effective in combination with the magnet HV in such a manner that the magnets TT$h$V, T$h$V and HV become operative to check the first, second and third characters respectively of the secondary selector identification number. As previously explained, provision is made for the reading of ninety-nine meters after the secondary selector is read. When a secondary selector is encountered, the switch arm 214 of the hundreds switch becomes actuated by the magnet HC, which is energized from the battery B1 in the manner previously described. Energization of the magnet HC is also accompanied by the closing of a contact C39. The contacts C58 which are controlled by the magnet HC, periodically, after the reading of ninety-nine meters has been effected, close a circuit passing through the magnet HM.

Energization of the magnet HM, by means of the pairs of contacts C39, serves to close a plurality of contacts C36, C37, C38, C40 and C56, and to open a plurality of contacts C23, C27, C33, C34, C35 and C52.

The pair of contacts C40, when closed by the magnet HM, causes said magnet to become locked in the energized position. The only way in which the magnet HM may be unlocked is by energizing the magnet UC and causing the normally closed pair of contacts C57 to become open, thus breaking the aforementioned locking circuit. Thus, after the last meter connected to a secondary selector has been read, the magnet HC causes the magnet HM to become energized and locked in the energized position. The magnet HM will remain in this energized position until the reading of the first meter on the next secondary selector is completed, at which time the magnet UC will be energized causing the contacts C57 to open and unlock the magnet HM.

The six contacts C36, C37, C38, C33, C34 and C35 are interrelated, and in combination serve to shift the phase of the three contacts H, T and U on the switch level S'2 from potential energization of the magnets HV, TV and UV to potential energization of the magnets TT$h$V, T$h$V and HV respectively. In other words, whereas when verifying a meter identifying number the magnet UV represents the units digit of the identification number, the magnet TV represents the tens digits of the identification number and the magnet HV represents the hundreds digit of the identifying number, when verifying a secondary selector, the magnet HV represents the units digit of the secondary selector identifying number, the magnet T$h$V represents the tens digit of this number and the TT$h$V magnet represents the hundreds digit thereof. In the drawings, the magnet UV has been labeled "Units M," the magnet TV has been labeled "Tens M" and the magnet HV has been labeled "Hundreds M" for convenience to illustrate the fact that these three magnets jointly are employed when verifying a meter. Similarly, the magnet HV, in addition to its other labeling, has been labeled "Units SS," the magnet T$h$V has been labeled "Tens SS" and the magnet TT*h*V has been labeled "Hundreds SS" to show that these three latter magnets are jointly employed when verifying a secondary selector. At the risk of repetition, it is pointed out that each of the magnets UV, TV, HV, T*h*V and TT*h*V performs a special function in connection with the coding apparatus 251, causing this apparatus to operate in a special manner so that unless the numbers or digits set up in the counter mechanism 210 checks with the numbers actually being read, whether this number is a meter identifying number or the identifying number of a secondary selector, the operation of the apparatus will be terminated immediately or at some subsequent moment prior to the completion of a meter reading cycle.

The verifying contact block and associated instrumentalities

Each of the magnets UV, TV, HV, T*h*V and TT*h*V has associated therewith a contact group, which groups are labeled respectively "units group," "tens group," "hundreds group," "thousands group" and "ten-thousands group," the entire arrangement constituting a verifier contact block 310. The units group consists of a plurality of pairs of opposed contacts 312 adapted to be selectively engaged by a movable contact 313, the various contacts 313 being controlled in unison by the armature (not shown) of the units magnet UV. Each pair of contacts 312 and its associated movable contact 313 constitutes in effect a two-way switch. The number of pairs of contacts in the units group corresponds to the number of magnets employed in the coding mechanism 251. The movable contact 313, associated with each pair of contacts 312, is electrically connected to one of the magnets of the coder mechanism 251. As shown in the drawings, each pair of contacts 312 includes an upper contact and a lower contact, the lower contact leading to the units stepping switch or second level 212′ of the units switch 212. The upper contact of each pair 312 is connected to a corresponding movable contact associated with the tends group of contacts.

The tens group of contacts is substantially identical with the units group, but the movable contacts associated therewith are controlled in unison from the tens magnet TV. The upper contact of each pair of contacts is connected to a corresponding movable contact in the hundreds group of contacts and this latter group is also substantially identical with the preceding groups. The thousands group of contacts and the ten-thousands group of contacts are similarly connected in the contact group block in sequential arrangement in such a manner that normally, when none of the control magnets is energized, a path for current is provided from each of the coder magnets to ground. However, when any one of the first four control magnets, i. e., the units, tens, hundreds or thousands magnets becomes energized, all of the movable contacts shift out of engagement with their respective upper contacts of the contact pairs and into engagement with the lower contacts thereof. The lower contacts of each group are connected to respective distributor contacts on the various stepping switches 212′, as clearly shown.

In the ten-thousands group of contacts, the lower contacts of each pair, instead of being connected to a series of distributor contacts on a stepping switch, is connected to one terminal of a four-wire contact jack 314 (see Fig. 2), from whence connection may be made manually by a plugging-in operation to ground utilizing a plug 315.

Referring now to Fig. 2, in addition to the terminal for the verifying process leading to ground just described, the plug includes the three additional terminals, as previously described. One of these terminals, as heretofore explained, is electrically connected to the magnet PM and forms a means whereby this magnet is connected to the meter reading line leading through the primary and secondary selectors to the various meters. Another of these terminals is electrically connected to the pair of contacts C14 to pulse the secondary selector. The third terminal is adapted to be electrically connected during the plugging-in operation to contacts C15 to pulse the various primary selectors.

As mentioned before, the secondary selector may have unemployed meter positions by virtue of a closed account or by virtue of a non-existent account. The line $rl$, instead of being connected to an actual meter, is connected to a resistor having a resistance value XO, which is considerably higher than the ohmic value of the stepping magnet MP and which is normally connected to secondary selector contacts. Thus, when the line $rl$ becomes connected to a blank or vacant contact by the secondary selector, the magnet PM in the central station will not become fully energized by virtue of the high resistance in series with it.

Immediately after advancing to a new meter, the arm 200 on the stepping switch S2 rests on contact 8 and the starting magnet SM tends to become energized. However, there is a slight delay in the full energization of this magnet by virtue of a copper jacket 350. The discriminator 206, however, responds to the resistance XO and causes a magnet XM to become energized. This causes a pair of contacts C6 to become opened, thus breaking the circuit through the magnet SM and preventing its full energization. In addition to opening contacts C6, the magnet XM causes contacts C25, C29 and C21 to become opened, and contacts C42, C44, C46 and C48 to become closed. The opening of contacts C25 has no electrical significance at this time, because the normally closed contacts C27 on the magnet HM effectively shorts the said opening action. The opening of the contacts C29 effectively isolates the magnet HC of the counter 210 from the magnets TC and UC, thus permitting the magnet HC to become energized, yet preventing it from energizing the magnets TC and UC. The pulsing magnet UC, however, may still be energized by other means. The contacts C21 in opening have no effect, since they are shorted by the normally closed contacts C23 on the magnet HM. Upon the closure of the contacts C48, the magnet UC in the electrical counter 210 becomes energized through a circuit also containing a normally closed contact C50 on a magnet ES. The contacts C44 in closing effectively connect one side of the magnet ES to the positive side of the battery B1. The contacts C42, being in parallel with the contacts C15 on the magnet CM, cause the contacts C15 to become effectively shorted. This action, however, has no significance at this particular time. The contacts C46 are in series with the normally closed contacts C52 on the magnet HM, the combination of which is effectively connected across the contacts C14 on the magnet CM. Thus, upon the closure of the contacts C46, the contacts C14 are effectively shorted, unless the magnet HM is energized and the contacts C52 opened. As already mentioned, contacts C48 cause the magnet UC to become energized, thus presetting the ratchet mechanism 216 and causing contacts C17 and C57 to become opened, and C18 and C19 to become closed. The contacts C19, upon becoming closed, cause the energization of the magnet ES. The contact C18, upon becoming closed, causes a pulse to be sent to the secondary selector, thus energizing the secondary selector stepping magnet SP and presetting the ratchet mechanism. The magnet ES, upon energization, is held in the energized position by contacts C54. The contacts C50, however, are open and the magnet UC is deenergized. When the magnet UC becomes deenergized, the contacts C18 again become open, thus causing the secondary selector to become deenergized and advanced one position. In advancing from one contact to the next, the secondary selector momentarily breaks the reading line *rl*, thus breaking the signal sent to the discriminator 206 and causing the magnet XM to become deenergized. Upon the deenergization of the magnet XM, the magnet ES is deenergized by virtue of the opening of contacts C44. Thus, the secondary selector has been advanced one position, the electrical counter 210 has been advanced one position and nothing has been perforated on the tape by the perforator 208. Should the next contact on the secondary selector also be a blank contact, the aforementioned operations will again take place.

There are times when the public utility may deem it necessary to provide for the future installation of a complete secondary selector, in which case there will be a blank contact on the primary selector. A resistance of XO value will be connected between this blank contact on the primary selector and the ground in exactly the same manner as was done in the case of the secondary selector. As previously mentioned, the magnet HM is locked in the energized position for one full meter reading cycle each time the primary selector is advanced one position. Thus again, the XO resistance prevents the magnet PM from becoming fully energized and causes the discriminator to energize the magnet XM. However, the functions of some of the contacts on the magnet XM will now be entirely changed because of the effect of the contacts on the magnet HM. When the magnet XM is fully energized, the contacts C6 open, again preventing the full energization of the magnet SM. The contacts C44 again cause the positive side of battery B1 to become connected to the magnet ES. The contacts C46 have no effect because the energization of the magnet HM causes contacts C52 in series therewith to become opened. The contacts C42 again effectively short the contacts C15 on the magnet CM. The contacts C25, upon opening, prevent the magnet HC in the counter 210 from energizing the magnet TC, since the contacts C27 on the magnet HM are also opened.

The contacts C29, upon opening, further serve to isolate the magnet HC from the magnet TC. However, a contact C56 on the magnet HM completes the circuit of the magnet HC to ground. The contacts C21 in opening positively prevent the energization of magnets UC and TC in any manner, because contacts C23 on the magnet HM are now opened and the ground circuit of the magnets UC and TC thus broken. The contacts C48 upon closing will now, therefore, cause the energization of the magnet HC and the consequent closure of the contacts C24, C22, C39 and C58. The closure of contacts C24 has no effect at this time, since the contacts C25 and C27 are both open and effectively break its circuit. (This was the contact that formerly energized the magnets TC and UC.) Contacts C22, upon closure, cause the primary selector stepping magnet PP to become energized, thus presetting the primary selector ratchet mechanism. (This effect can take place because of the contacts C42 on the relay XM.) Since the magnet HM has already been energized and locked, the closure of the contacts C39 has no additional effect at this time. The closure of the contacts C58 cause the energization of the magnet ES, since the contacts C44 have already been closed by the magnet XM. The contacts C54 and C50 become closed and opened, respectively, upon the energization of the magnet ES. The contacts C54 effectively lock the magnet ES in its energized position. The openings of the contacts C50 breaks the circuit of the magnet HC, causing it to become deenergized and thus advancing its counting mechanism and opening the contacts C58, C39, C22 and C24. Upon the opening of the contacts C22, the primary selector stepping magnet is deenergized, causing the line *rl* to become connected to the succeeding contact. This causes the circuit, including the line *rl*, to become momentarily broken, thus deenergizing the discriminator 206. The magnet XM is thereby deenergized, opening contacts C48, C46, C44, C42 and closing contacts C21, C29, C25 and C6. Upon opening of the contacts C44, the circuit of the magnet ES is broken, thereby unlocking said magnet. Thus, the electrical counter 210 is advanced one hundred positions by virtue of the advancement of its hundreds register control by the magnet HC and the primary selector is advanced to the next secondary selector. The perforator is neither advanced nor actuated in the process.

Throughout this specification and in the accompanying claims, it will be distinctly understood that by the terms "meter," "outlying station," "outlying location," or "remote point," it is intended to include not only the various instrumentalities existing in physically close proximity to a meter or a secondary selector or a primary selector, such as, for example, a controlling selecting switch and its phasing magnet, etc., but also such connections as are electrically close to the meter or selector, and which lead from the same to a preceding selector to which it is connected and by means of which it is controlled and to, but not including, the specific contact in that selector from which controlling impulses are received and to which reading impulses are transmitted emanating from and relayed to the central station respectively.

What is claimed is:

1. In a telemetering system for recording at a central station the indication of a plurality of meters located at remote points and having movable digit-indicating members associated therewith, a plurality of secondary selectors, impedance reading lines connecting each secondary selector to a group of meters, a primary selector, impedance reading lines and selector lines connecting the primary selector to a group of secondary selectors, an impedance reading line, a secondary selector line and a primary selector line connecting the primary selector to the central station, selecting means at each meter for selecting the digit-indicating members and for immediately thereafter varying the impedance value of said reading line in accordance with the indication of the selected member, and means at the central station operable in phase relationship with said selecting means for controlling the reading and selecting operations.

2. In a telemetering system for recording at a central station the indication of a plurality of meters located at remote points and having movable digit-indicating members associated therewith, a plurality of secondary selectors, impedance reading lines connecting each secondary selector to a group of meters, a primary selector, impedance reading lines and selector lines connecting the primary selector to a group of secondary selectors, an impedance reading line, a secondary selector line and a primary selector line connecting the primary selector to the central station, selecting means at each meter for selecting the digit-indicating members and for immediately thereafter varying the impedance value of said reading line in accordance with the indication of the selected member, and means at the central station operable in phase relationship with said selecting means for controlling the reading and selecting operations in such a manner that each operation upon its conclusion serves to initiate the next operation.

3. In a telemetering system for recording at a central station the indication of a plurality of meters located at remote points, an impedance reading line leading from the central station, selecting means for successively connecting the various meters to said reading line, means for varying the impedance value of said reading line in accordance with a selected meter, a selecting line connecting the control station and said selecting means, a counter mechanism at the central station operable in phase with said selecting means, recording instrumentalities under the control of said counter mechanism including circuits leading from the former to the latter and closable only when said counter mechanism is in phase with said selecting means, and means operable upon actuation of said recording instrumentalities for controlling said selecting means.

4. In a telemetering system for recording at a central station the indication of a plurality of meters located at remote points, an impedance reading line leading from the central station, selecting means for successively connecting the various meters to said reading line, means for varying the impedance value of said reading line in accordance with a selected meter, a selecting line connecting the control station and said selecting means, a counter mechanism at the central station operable in phase with said selecting means, coding instrumentalities under the control of said counter mechanism, recording instrumentalities under the control of said coding instrumentalities, circuits connecting the counter mechanism, coding mechanism and recording instrumentalities closable only when said counter mechanism is in phase with said selecting means, and means operable upon actuation of said recording instrumentalities for controlling said selecting means.

5. In a telemetering system for recording at a central station the indication of a plurality of meters located at remote points, an impedance reading line leading from the central station, selecting means for successively connecting the various meters to said reading line, means for varying the impedance value of said reading line in accordance with a selected meter, discriminating means at the central station for discriminating the various impedance values of said reading line according to the particular meters which are selected, recording instrumentalties at the central station under the control of said discriminating means including electrical circuits connecting the discriminating means and recording instrumentalities, a counter mechanism at the central station interposed in said circuits and operable in phase with said selecting means for preventing closing said circuits when said counter mechanism and selecting means are out of phase, and means operable upon actuation of said recording instrumentalities for controlling said selecting means.

6. In a telemetering system for recording at a central station the indication of a plurality of meters located at remote points, an impedance reading line leading from the central station, selecting means for successively connecting the various meters to said reading line, means for varying the impedance value of said reading line in accordance with a selected meter, discriminating means at the central station for discriminating the various impedance values of said reading line according to the selected meters including a plurality of circuits capable of potentially being closed in accordance with the discriminated values, a coding device including a plurality of coding magnets operatively connected to said circuits for potential selected actuation thereby, means operable in phase with said selecting means for closing said potentially closed circuits, and a recording device operable from said coding device.

7. In a telemetering system for recording at a central station the indication of a plurality of meters located at remote points, an impedance reading line leading from the central station, selecting means for successively connecting the various meters to said reading line, means for varying the impedance value of said reading line in accordance with a selected meter, discriminating means at the central station for discriminating the various impedance values of said reading line according to the selected meters including a plurality of circuits capable of potentially being closed in accordance with the discriminated values, a coding device including a plurality of coding magnets operatively connected to said circuits for potential selected actuation thereby, means operable in phase with said selecting means for closing said potentially closed circuits, a recording device operable from said coding device, and means operable upon actuation of said recording device for controlling the operation of said selecting means.

8. In a telemetering system for indicating at a central station the relative positions of a plurality of movable members located at a remote point, a stepping switch at the remote point for selecting the movable members, an energizable magnet operable during deenergization thereof to actuate said stepping switch to select a movable member, an energizable magnet at the central station electrically arranged in series with said first mentioned magnet and a counter mechanism at the central station under the control of said last mentioned magnet for cumulatively rendering an indication upon energization of said first mentioned magnet.

9. In a telemetering system for indicating at a central station the relative positions of a plurality of movable members located at a remote point, energizable selecting means operable during deenergization thereto to select the members at the remote point, an impedance reading line, means for varying the impedance value of said line in accordance with the positions capable of being assumed by said movable members, discriminating means at the central station of ascertaining a selected position of the movable member in accordance with the impedance value of said line, and energizable means at the central station arranged in series with said first mentioned energizable means for rendering said discriminating means operative upon simultaneous energization of both said energizable means.

10. In a telemetering system for indicating at a central station the relative positions of a plurality of movable members located at a remote point and each being capable of assuming a plurality of digit-representing positions, energizable selecting means for selecting the members at the remote point, an impedance reading line, means for varying the impedance value of said line in accordance with the positions capable of being assumed by said movable members, discriminating means at the central station for ascertaining the position of the movable members in accordance with the various impedance values of said line, energizable means at the central station arranged in series with said first mentioned energizable means for rendering said discriminating means operative, recording instrumentalities under the control of said discriminating means, means operable upon actuation of said recording instrumentalities for potentially energizing said selecting means, and means at the remote point for completing the potential energization of said selecting means.

11. In a fully automatic telemetering system for periodically and successively reading at a central station the identifying indication of certain of a plurality of outlying locations arranged for successive selection and for passing over or omitting to read the identifying indications of others of said outlying locations, an impedance reading line, an identifying resistance at each of said certain locations indicative of the identification of said locations, a resistance at each of said other locations having a special value different from said identifying resistances and all of which are of substantially equal value, selecting means for successively connecting said resistances in the reading line, discriminating means at the central station for ascertaining the impedance value of said reading line upon successive connection of each resistance at each location therein, and means operable when one of said resistances of of special value is connected in the reading line for advancing said selecting means.

JERRIER HADDAD.